July 28, 1942.  G. D. RANDOL  2,291,411
REMOTE CONTROL GEAR SHIFTING MECHANISM
Filed Dec. 14, 1938   2 Sheets-Sheet 1
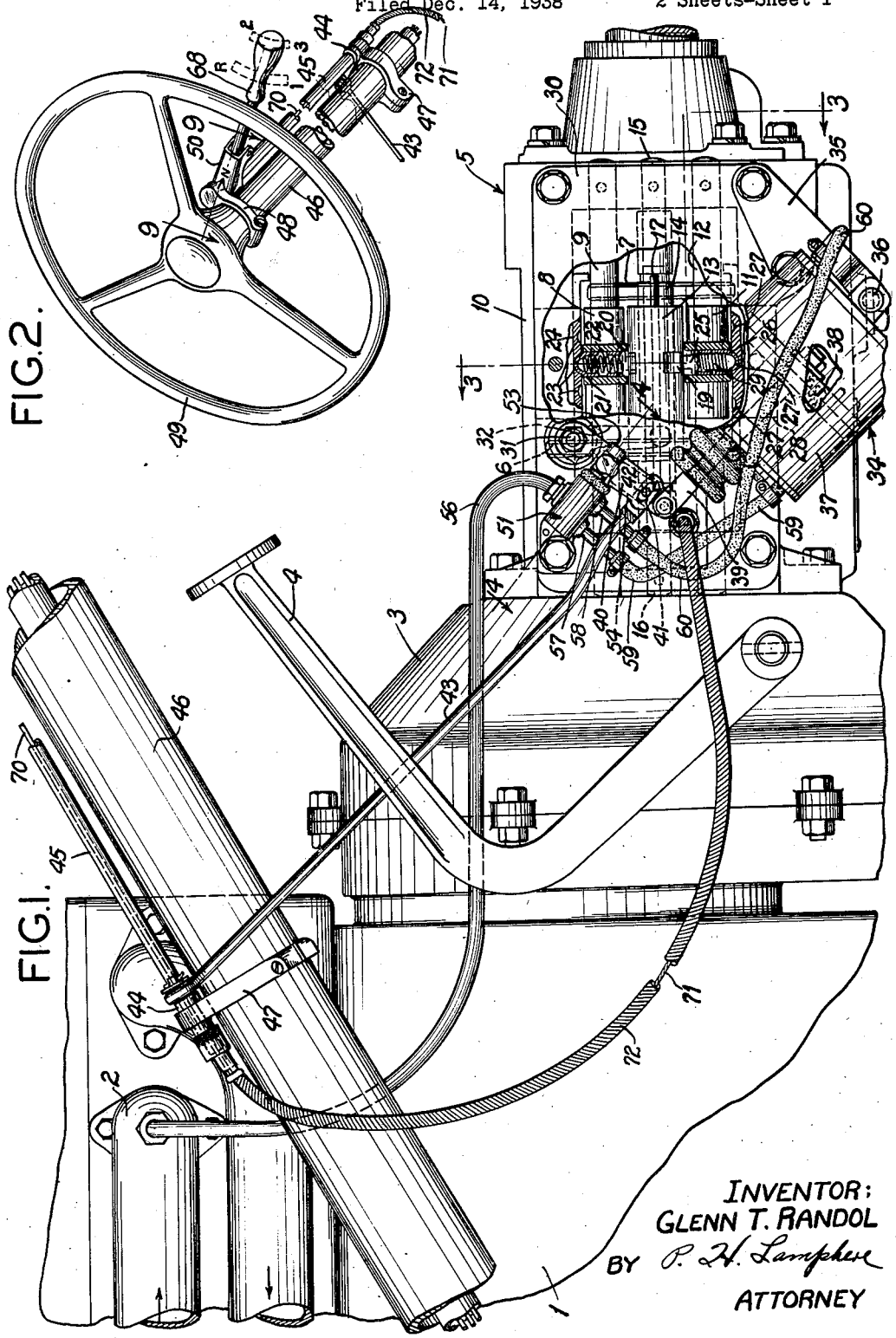
INVENTOR:
GLENN T. RANDOL
BY *P. H. Lamphere*
ATTORNEY July 28, 1942. G. D. RANDOL 2,291,411
REMOTE CONTROL GEAR SHIFTING MECHANISM
Filed Dec. 14, 1938 2 Sheets-Sheet 2
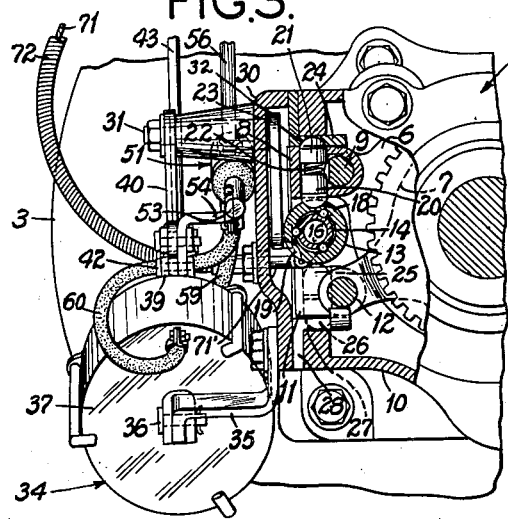
INVENTOR:
GLENN T. RANDOL
BY P. H. Lamphere
ATTORNEY Patented July 28, 1942

2,291,411

UNITED STATES PATENT OFFICE 2,291,411

REMOTE CONTROL GEAR SHIFTING MECHANISM

Glenn T. Randol, Jonesboro, Ark., assignor, by mesne assignments, to William M. Liddon, Nashville, Tenn.

Application December 14, 1938, Serial No. 245,584

5 Claims. (Cl. 74—477)

My invention relates to control means for change speed gearing and more particularly to a control means that may be operated by a lever positioned at a remote point from the change speed gearing.

One of the objects of my invention is to provide a single rotatable and longitudinally movable member for selecting and shifting the shiftable elements of a change speed gearing and to control this member by a single manual member movable in different planes and positioned at a remote point.

Another object of my invention is to so embody power means in the gear shifting mechanism that the shifting of the shiftable elements of the gearing will normally be performed by the power means but can also be performed manually in the event of total or partial failure of the power means.

Still another object of my invention is to provide improved remote control gear shifting mechanism which is simple in construction, efficient in operation and economical to manufacture and which is so associated with the change speed gearing that it can be installed either at the factory as original equipment or in the field as an accessory.

Other objects of my invention will become apparent from the following description taken in connection with the accompanying drawings in which Figure 1 is a side view, parts being shown in section, of a portion of a motor vehicle power plant showing a remote control gear shifting mechanism embodying my invention; Figure 2 is a view of the hand control lever mounted on the steering column; Figure 3 is a cross-sectional view taken on the line 3—3 of Figure 1 showing a portion of the mechanism associated with the gear box and gearing therein; Figure 4 is a cross-sectional view through the control valve, said view being taken on the line 4—4 of Figure 1; Figures 5 and 6 are similar cross-sectional views of the control valve and associated parts showing the valve in an inoperative and an operative position, respectively; Figure 7 is a perspective view of the single rotatable and longitudinally movable member for selecting and shifting the shifting forks of the gearing elements; Figure 8 is a cross-sectional view taken on the line 8—8 of Figure 7; and Figure 9—9 of Figure 2 showing how the hand lever is connected to the rotatable shaft and flexible cable.

Referring to the drawings in detail, numeral 1 indicates the internal combustion engine of a motor vehicle which is provided with the usual intake manifold 2 leading from the carburetor (not shown), this manifold having partial vacuum therein when the engine is operating, it being at maximum when the engine is at idling speed. The engine drives the usual propeller shaft through the medium of a clutch 3 controlled by a clutch pedal 4 and a change speed gearing 5 in a well-known manner. The gearing 5 is of conventional construction and includes two shifting forks 6 and 7 for controlling the shiftable elements thereof. The shifting fork 6 by a forward and rearward movement controls the shiftable element for high and second speed ratios, respectively, and the shifting fork 7 by a forward and rearward movement controls the shiftable element for low and reverse speed ratios, respectively. The fork 6 is provided with a hub portion 8 slidably positioned on a rod 9 mounted at the side of the gearing housing 10. Similarly, shifting fork 7 is provided with a hub portion 11 slidably positioned on a rod 12 also mounted at the side of the gearing housing and in spaced parallel relation to rod 9.

In accordance with my invention, I position a combined rotatable and longitudinally slidable control member 13 between the hubs 8 and 11 of the shifting forks whereby by means of this member the forks may be selected as desired and the selected forks shifted longitudinally to move the shiftable element of the gearing and thus secure the proper speed ratio. The control member 13 (Figure 7) is of cylindrical construction and is mounted on a supporting shaft 14 which is rotatably supported at its ends in the gearing housing by stub-shafts 15 and 16 secured to the end walls of the housing and projecting into bores in the end of said shaft. The control member 13 is secured to shaft 14 but held in spaced relation thereto by means of circumferentially spaced longitudinally positioned key-rods 17 which cooperate with longitudinal grooves in the inner surface of the member 13 and the outer surface of shaft 14. This construction permits the member 13 to freely shift longitudinally with respect to shaft 14 while at the same time being rotatable therewith. The member 13 adjacent its center is provided with slots 18 and 19 which are circumferentially spaced apart substantially 120 degrees.

The hub 8 of the shifting fork 6 carries a pair of axially positioned plungers 20 and 21 having interposed therebetween a spring 22 for normally biasing them in opposite directions. The end of plunger 20 is adapted to cooperate with slot 18 in member 13, it having flat side surfaces thereon which cooperate with the flat side surfaces of the slot so that when the end of the plunger is in the slot, the control member 13 and the fork will be connected together and any longitudinal movement of member 13 will also result in longitudinal movement of the shifting fork 6. The plunger 21 is formed with a round head for cooperation with spaced recesses 23 in a plate 24 secured to the gearing housing, the central recess being of slightly greater depth than the two outer recesses. The lengths of the two plungers 20 and 21 are such that when plunger 20 is in slot 18, plunger 21 can be moved out of any of the recesses 23. However, the relation of the lengths of the plungers will not permit the plunger 20 to be moved out of slot 18 when plunger 21 is in either of the shallow end recesses 23 but will permit such movement when plunger 21 is in the deeper central recess 23. Also, when member 13 is rotated to a position so that plunger 20 is moved out of slot 18 and up on the outer surface of the said member, the plunger 21 cannot be moved out of the central recess 23, thereby locking the fork against longitudinal movement.

The hub 11 of the shifting fork 7 also carries two axially positioned plungers 25 and 26 which are identical to the plungers 20 and 21. The plunger 25 cooperates with slot 19 in the rotatable control member 13 and plunger 26 cooperates with the three recesses 27 in plate 28 fixed to the gearing housing. A spring 29 biases the two plungers 25 and 26 in opposite directions. When the plunger 25 is in slot 19, the shifting fork 7 will be connected to member 13 whereby the fork will be moved with the member when the latter is moved longitudinally. When plunger 25 is in slot 19, plunger 26 can be moved out of any of the recesses 27 but plunger 26 must be in the central recess 27 before plunger 25 can be moved out of slot 19. When member 13 is in a position where plunger 25 rides out of slot 19 and onto the surface of member 13, plunger 25 will prevent plunger 26 from coming out of the deeper central recess 27, thereby locking the fork against longitudinal movement. Since plungers 20 and 25 are positioned on diametrically opposite sides of the member 13 and slots 18 and 19 are only substantially 120 degrees apart, only one of the plungers 20 or 25 can be in its cooperating slot at any one time. Thus it is impossible to move the two shifting forks simultaneously.

The cover 30 for the change speed gearing housing has mounted thereon a shaft 31 which has secured to its inner end a lever 32, the lower end of which is adapted to project into a slot 33 in the forward end of member 13 whereby the lever may move said member longitudinally whenever shaft 31 is rotated.

A suction motor 34 is mounted on the exterior of the gearing housing by means of a bracket 35, the rear end of the motor being pivotally connected at 36 to said bracket. The motor comprises a cylinder 37 within which is reciprocable a piston 38 having connected thereto a piston rod 39 extending through the forward end of the cylinder and connected to the lower end of an arm 40 secured to the exterior end of shaft 31.

The intermediate portion of arm 40 closely adjacent its connection with the piston rod 39 is provided with a clearance slot 41 which receives the connecting pin 42. The rod 43 extends upwardly and is connected to an arm 44 secured to the lower end of a tubular shaft 45 rotatably mounted on the steering column 46 of the vehicle by means of a lower bracket 47 and an upper bracket 48 positioned just below the steering wheel 49. The upper end of the tubular shaft has secured thereto an arm 50 whereby the tubular shaft 45 may be rotated to thereby move the rod 43 in either direction.

The suction motor is controlled by means of a valve 51 comprising a valve casing 52 secured to the gearing housing cover and a movable valve element 53 reciprocable therein. The element 53 is reciprocated by means of a lever 54 connected thereto and pivotally mounted on the pin connecting the end of the piston rod and lever 40. The intermediate portion of lever 54 is connected to rod 43 by the pin 42 which extends through clearance slot 41 in lever 40.

The valve casing 52 has a port 55 connected to the intake manifold 2 of the engine by means of the conduit 56 and in the opposite side of said casing are spaced ports 57 and 58, the former being connected by means of a conduit 59 with the forward end of cylinder 37 of the suction motor and the latter being connected by a conduit 60 with the rear end of cylinder 37. The movable valve element 53 is formed with intercommunicating grooves 61 in constant communication with the port 55 and so arranged that this port can be selectively placed in communication with the ports 57 and 58 or cut off from both, depending upon the position assumed by the valve element. The forward end of the valve element 53 is provided with a passage 62 whereby when the valve element is in its shut-off position shown in Figure 5, the forward end of cylinder 37 will be in communication with the atmosphere through a port 63 in the end of the valve casing. The valve element is also provided with a groove 64 for placing the rear end of cylinder 37 in communication with the atmosphere through port 58. A pin 65 is carried by the valve casing and cooperates with a slot 66 for limiting the travel of the valve element and a dust excluding boot 67 extends between the valve element and the valve casing.

In order that the control member 13 in the transmission may be rotated and moved longitudinally by a single control member, the arm 50 on the upper end of the tubular shaft 45 carried by the steering column has pivoted thereon a hand lever 68 and the inner end of this lever is connected by a ball and socket joint with a member 69 reciprocably mounted in the upper end of the tubular shaft 45. A rod 70 is connected to the member 69 and extends down through the tubular shaft 45 where it has connected thereto a cable 71 extending into the gearing housing 10. The cable is enclosed in a sheath 72 in order that movement of one end of the cable will be properly transmitted to the other end. The lower end of the cable within the gearing housing is connected, by means of a short rod 71', to an arm 73 carried by the end of shaft 14 which supports the control member 13. A spring 74 (Figure 9) is interposed between the member 69 in the upper end of the tubular shaft 45 and an abutment pin 75 to bias the member and rod to such positions that the control member 13 in the gear box will be in a position where the plunger 20 carried by shifting fork 6 will enter slot 18 in the control member.

Referring to the operation of my improved remote control gear shifting mechanism, when the gearing is in neutral position, the parts of the shifting mechanism will be as shown in Figures 1, 2, 3 and 6. Both shifting forks will be in their central position as shown in Figure 1. The hand lever 68 will be biased by spring 74 so that its outer end will be in its lower position. This will cause the control member 13 to be in the position where the plunger 20 is in slot 18 and the plunger 25 is out of slot 19. The control valve 51 will be in the position shown in Figure 5 where both ends of the cylinder of the suction motor are connected to atmosphere and communication with the manifold is cut off. The rod 43 will be in such a position that the connecting pin 42 will be at the center of the slot 41 (Figure 5). The piston of the suction motor will be at the center of the cylinder 37 and the lever 32 will be in its central position as indicated by dash lines (Figure 5).

If it desired to place the change speed gearing in low speed ratio, the clutch 3 is first disengaged by depressing the clutch pedal 4. The hand lever 68 beneath the steering wheel is then grasped by the operator and pulled upwardly. This will result in rod 70 being moved downwardly through shaft 45 and shaft 14, and control member 13 rotated in a counter-clockwise direction to a position where the plunger 25 will engage in slot 19 and plunger 20 will be moved out of slot 18. The gear shifting fork 7 will now be selected, that is, connected to the control member 13. Next the hand lever 68 is rotated in a clockwise direction in a plane parallel to the steering wheel and to the position indicated by the numeral "1" (Figure 2). This movement of the lever rotates the tubular shaft 45 and moves the rod 43 upward. Since rod 43 is connected by means of the pin 42 to the lever 54, the movable valve element 53 will be moved to the left and assume the position shown in Figure 6. The manifold 2 will now be connected to the front end of the suction motor 34 and air will be exhausted therefrom. Air under atmospheric pressure will enter the rear end of the suction motor as port 57 communicates with the atmospheric port 63. The differential pressures acting upon piston 38 will now cause the piston to move from the central position to the left end of the cylinder (Figure 1), thereby swinging levers 40 and 32 in a clockwise direction and causing the control member 13 to be longitudinally moved to the left as viewed in Figure 1. Since the shifting fork 7 is connected to the control member 13, it also will be carried to the left and the shiftable element of the change speed gearing placed in a position causing the low speed ratio to be operative. When the piston reaches the end of the cylinder, the lever 54 will be rotated about pin 42 to return the valve element 53 to its inoperative position as shown in Figure 5. The vehicle can now be driven forward through this gear ratio when the clutch is permitted to become engaged.

As soon as the valve element 53 is moved to a position placing the rear end of the suction motor in communication with the manifold, the piston and lever 40 will begin to move and also the lower end of valve lever 54 to keep the valve open as long as rod 43 is moved. No manual force will be employed to move lever 40 unless rod 43 is moved more rapidly than the follow-up movement of lever 40. If this should happen, lever 54 will fulcrum at its upper end on valve element 53 and manual force will be transferred through the lower end of lever 54 to the lower end of lever 40, thereby assisting the suction motor.

Thus the control member 13 will be moved solely by the fluid motor when an average rate of shifting movement is given to the hand lever 68 but if a greater rate of movement is given to the hand lever, the control member 13 will be moved both by the suction motor and by manual force.

When it is desired to again place the change speed gearing in neutral condition, the clutch is disengaged and the hand lever 68 moved from the position indicated at "1" (Figure 2) back to its central position which would be in alignment with the pointer formed on the bracket 48 beneath the steering wheel. This movement of the hand lever causes rotation of the tubular shaft 45 and movement of rod 43. The valve element 53 now will be moved to the right of the position shown in Figure 5 resulting in the manifold being placed in communication with the rear end of the suction motor and the forward end of the suction motor placed in communication with atmosphere. The piston will now be operated to move lever 40 in a counter-clockwise direction and shift the control member 13 back to its neutral position. When this position is reached, the valve element 53 will be returned to its normally inoperative position as shown in Figure 5 since the rearward movement of the piston rod 39 will cause lever 54 to swing about pin 42. When the gear shift lever is in its neutral position, spring 73 will be effective to move the end of the lever downwardly, thus causing the flexible cable to be pulled upwardly and the control member 13 rotated to a position where plunger 25 is moved out of slot 19 and plunger 20 permitted to engage with slot 18 as shown in Figure 1. Under these conditions the shifting fork 6 is connected to the control member 13.

If it is desired to place the gearing in second speed, the clutch is disengaged (if not already in disengaged position) and the hand lever 68 moved in a plane parallel to the steering wheel and to the position marked "2" (Figure 2). This will cause the parts of the valve to assume a position placing the rear end of the suction motor in communication with the manifold and the forward end of the suction motor in communication with the atmosphere. The suction motor will now be operated to move lever 40 in a counter-clockwise direction, thereby moving the control member 13 to the right as viewed in Figure 1 and carrying with it the shifting fork 6 to thus place the gearing in second speed position.

When it is desired to place the change speed gearing in high speed position, the clutch is disengaged and the hand lever 68 moved in a plane parallel with the steering wheel from the position marked "2" to the position marked "3". This will cause the valve to place the forward end of the suction motor in communication with the manifold and the rear end of the suction motor in communication with the atmosphere. The piston of the suction motor will now move from the rear end of cylinder 37 to the forward end of cylinder 37, thereby causing the control member 13 to move the shifting fork from its right position to its left position, as viewed in Figure 1, and thus place the change speed gearing in high speed.

If reversed speed is desired at any time, the hand lever 68 is moved upwardly toward the steering wheel and then moved parallel to the plane of the steering wheel to the position indicated at "R". This will properly position valve 51 so that the piston of the suction motor can move the control member 13 rearwardly and carry with it the shifting fork 7 to place the gearing in reverse condition.

If at any time the source of suction should fail, the shifting forks may, nevertheless, be shifted manually solely by the hand lever 68 with the same motions as are employed when the suction motor is effective to perform the shifting. If the suction motor should fail, the movement of rod 43 after moving the valve element 53 to open position (lost motion movement) will actuate the lever 49 through lever 54 and perform the shifting in the same manner as would be done by the suction motor. It is to be especially noted that when lever 49 is moved manually, the casing of the valve will take the reactive force through pin 65 and thus it will be impossible to cause the valve mechanism to be injured or its adjustment changed.

It is also to be noted that once a shifting fork is moved to an operative position, it is impossible to rotate the control member by means of the hand lever 68 until said control member is returned to its neutral or central position. This is all accomplished by the arrangements of the plungers and the parts which cooperate therewith. If, for example, the shifting fork 6 is in an operative position, plunger 21 will be in one of the shallow end recesses 23 and, therefore, the plunger 20 will be prevented from having sufficient movement to be forced out of slot 18. Thus the control member is prevented from being rotated when such rotation is not desired. The hand lever 68 must always be returned to its neutral position as indicated by the pointer on the bracket 48 before it can be moved up or down to select a gear ratio. When the hand lever is in this position, the control member will always assume its central position.

The movable valve element 53 is so controlled by the hand lever 68 and the piston of the suction motor that after being opened by movement of the hand lever, it will be closed by the movement of the piston through lever 54. If the hand lever is stopped at any point in its movement parallel to the plane of the steering wheel after the valve is opened, the piston will only move such a distance as will be necessary to close the valve. Thus the extent of movement of the hand lever controls the extent of movement of the piston of the suction motor giving the necessary "feel" to properly engage the shiftable elements of the gearing.

Since the control member 13 is supported in spaced relation on the shaft 14 by means of the key-rods 17, the frictional resistance to movement of the control member 13 longitudinally will be a minimum. The surface in contact between the control member and shaft is a minimum and, therefore, lubricant will also not cause the parts to so adhere to each other as to produce any appreciable resistance to axial movement of the control member.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In gear shifting mechanism for a change speed gearing, a support, a shifting fork mounted on said support for movement in opposite directions from a neutral position, a rotatable and axially slidable control member position adjacent the shifting fork and provided with a slot, the axis of said member being parallel with the line of movement of the shifting fork, a yieldable detent carried by the shifting fork for engaging the slot in the control member to connect said fork to the control member by a rotation thereof when the fork is in neutral position, means carried by the shifting fork and so cooperating with the detent thereon and the support that said fork will be locked against movement relative to the support when the detent is out of engagement with the slot and said means also so cooperating with the detent and the support that the fork will be locked to the control member and said member will be prevented from rotation when the detent is in the slot and the shifting fork is moved to an operative position in either direction from the neutral position by the control means, means for rotating said control means, and other means for moving the control means axially in both directions from the neutral position.

2. In gear shifting mechanism for a change speed gearing, a support, a shifting fork mounted on said support, a rotatable shaft positioned adjacent the fork, a sleeve mounted on the shaft for rotation therewith and also for longitudinal movement relative thereto, said sleeve being provided with a slot, a detent carried by the fork for engaging the slot and connecting said fork to the sleeve, means carried by the fork and cooperating with the support for holding the detent in the slot when the sleeve moves the fork from its neutral position in either direction to an operative position, said means being moved to cooperate with the support to hold the fork in its neutral position when the sleeve is rotated to move the detent out of the slot and disconnect the fork from the sleeve, means for rotating the shaft, and means for moving the sleeve longitudinally in either direction.

3. In gear shifting mechanism for a change speed gearing, two shifting members carried by the support in spaced relation and each having a neutral position and two operative positions on opposite sides thereof, a rotatable and axially slidable control member having a cylindrical surface and positioned between the shifting members with its axis parallel with the line of movement of the shifting members, said control member being provided with circumferentially spaced slots, a spring biased detent carrier by each shifting member, each of said detents riding on the cylindrical surface and adapted to be selectively engaged in a slot of the control member by rotation of said control member whereby either shifting member may be moved in opposite directions from a central neutral position to an operative position by the control member, means carried by each shifting member and so cooperating with the detent thereon and the support that said shifting member will be locked against movement when its detent is out of engagement with the cooperating slot in the control member and said control member will also be prevented from rotation by said means when the detent is in its cooperating slot and the shifting member is in either of two operative positions, means for rotating said control member, and means for moving said control member axially.

4. In gear shifting mechanism for a change speed gearing, a support, two shifting forks carried by the support in spaced relation and each having a neutral position and two operative positions on opposite sides thereof, a rotatable and axially slidable control member positioned between the shifting forks, said control member being provided with circumferentially spaced slots, two opposed spring biased plungers carried by each shifting fork, one of said plungers on each shifting member adapted to be selectively engaged in a slot of the control member by a rotation of said control member whereby either shifting fork may be moved in opposite directions from its neutral position to an operative position by the control member, means comprising recesses on the support for cooperating with the other plunger on each shifting fork, said recesses and the plungers being so related that a shifting fork will be locked in its neutral position against movement when its plunger is out of engagement with the cooperating slot in the control member and said control member will be prevented from rotation when a plunger is in its cooperating slot and the shifting fork is in an operative position, means for rotating said control member, and means for moving said control member axially.

5. In gear shifting mechanism for a change speed gearing, a support, two shifting forks carried by the support in spaced relation and each having a neutral position and two operative positions on opposite sides thereof, a rotatable shaft positioned between the forks, a sleeve mounted on the shaft for rotation therewith and also for longitudinal movement relative thereto, said sleeve being provided with circumferentially spaced slots, two opposed spring biased plungers carried by each shifting fork, one of said plungers on each shifting member adapted to be selectively engaged in a slot of the sleeve by a rotation of said sleeve whereby either shifting fork may be moved in opposite directions from its neutral position to an operative position by the sleeve, means comprising recesses on the support for cooperating with the other plunger on each shifting fork, said recesses and the plungers being so related that a shifting fork will be locked in its neutral position against movement when its plunger is out of engagement with the cooperating slot in the sleeve and said sleeve and shaft will be prevented from rotation when a plunger is in its cooperating slot and the shifting fork is in an operative position, means for rotating said shaft, and means for moving said sleeve axially.

GLENN T. RANDOL.